(12) United States Patent
Yanagawa

(10) Patent No.: US 7,707,439 B2
(45) Date of Patent: Apr. 27, 2010

(54) INFORMATION PROCESSING APPARATUS INCLUDING A FIRST BUS CONNECTED A FIRST BUS DEVICE, A SECOND BUS CONNECTED TO A SECOND BUS DEVICE, A THIRD BUS CONNECTED TO A THIRD BUS DEVICE, A FIRST BUS BRIDGE CONNECTING THE FIRST BUS AND THE SECOND BUS AND A SECOND BUS BRIDGE CONNECTING THE FIRST BUS AND THE THIRD BUS

(75) Inventor: Katsuhiko Yanagawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 731 days.

(21) Appl. No.: 11/557,634

(22) Filed: Nov. 8, 2006

(65) Prior Publication Data

US 2007/0106916 A1    May 10, 2007

(30) Foreign Application Priority Data

Nov. 9, 2005   (JP)   ............................. 2005-324786

(51) Int. Cl.
*G06F 1/00* (2006.01)
(52) U.S. Cl. ...................................... 713/300
(58) Field of Classification Search .................. 713/300
See application file for complete search history.

(56) References Cited

U.S. PATENT DOCUMENTS

| 5,884,088 | A * | 3/1999 | Kardach et al. | 713/324 |
| 6,360,327 | B1 * | 3/2002 | Hobson | 713/300 |
| 2004/0128571 | A1 * | 7/2004 | Saunders et al. | 713/300 |

(Continued)

FOREIGN PATENT DOCUMENTS

CN    1617069 A    5/2005

(Continued)

OTHER PUBLICATIONS

Song, Kezhu, Zhang, Lingyun, Yang, Xiaojun, D2: PCI-to-PCI Bridge and Its Application Design, Electronic Technology, No. 3 pp. 5-8, 2002, China.

*Primary Examiner*—Thomas Lee
*Assistant Examiner*—Mohammed H Rehman
(74) *Attorney, Agent, or Firm*—Canon U.S.A. Inc. I.P. Division

(57) ABSTRACT

An information processing apparatus including a first bus connected a first bus device, a second bus connected to a second bus device, and a bus bridge connecting the first bus and the second bus. A power control unit supplies electric power to the first bus device and the bus bridge when the information processing apparatus is in an operative state, and stops power supply when the information processing apparatus is in a power saving state. A transmission control unit controls transmission of a recovery signal which is entered from the second bus device and transmitted to the power control unit to return the information processing apparatus from the power saving state to the operative state, when the information processing apparatus is in the power saving state. The power control unit resumes the power supply to the first bus device and the bus bridge in response to the recovery signal.

9 Claims, 6 Drawing Sheets

U.S. PATENT DOCUMENTS

2005/0108584 A1    5/2005    Kawakami et al.

FOREIGN PATENT DOCUMENTS

| | | |
|---|---|---|
| JP | 10-254570 A | 9/1998 |
| JP | 2003-345466 A | 12/2003 |
| JP | 2004-023281 A | 1/2004 |
| JP | 2005-038091 A | 2/2005 |
| JP | 2005-234989 A | 9/2005 |

* cited by examiner

FIG.3

| OPERATION LEVEL | LAN | USB |
|---|---|---|
| 1 | VALID | VALID |
| 2 | INVALID | INVALID |

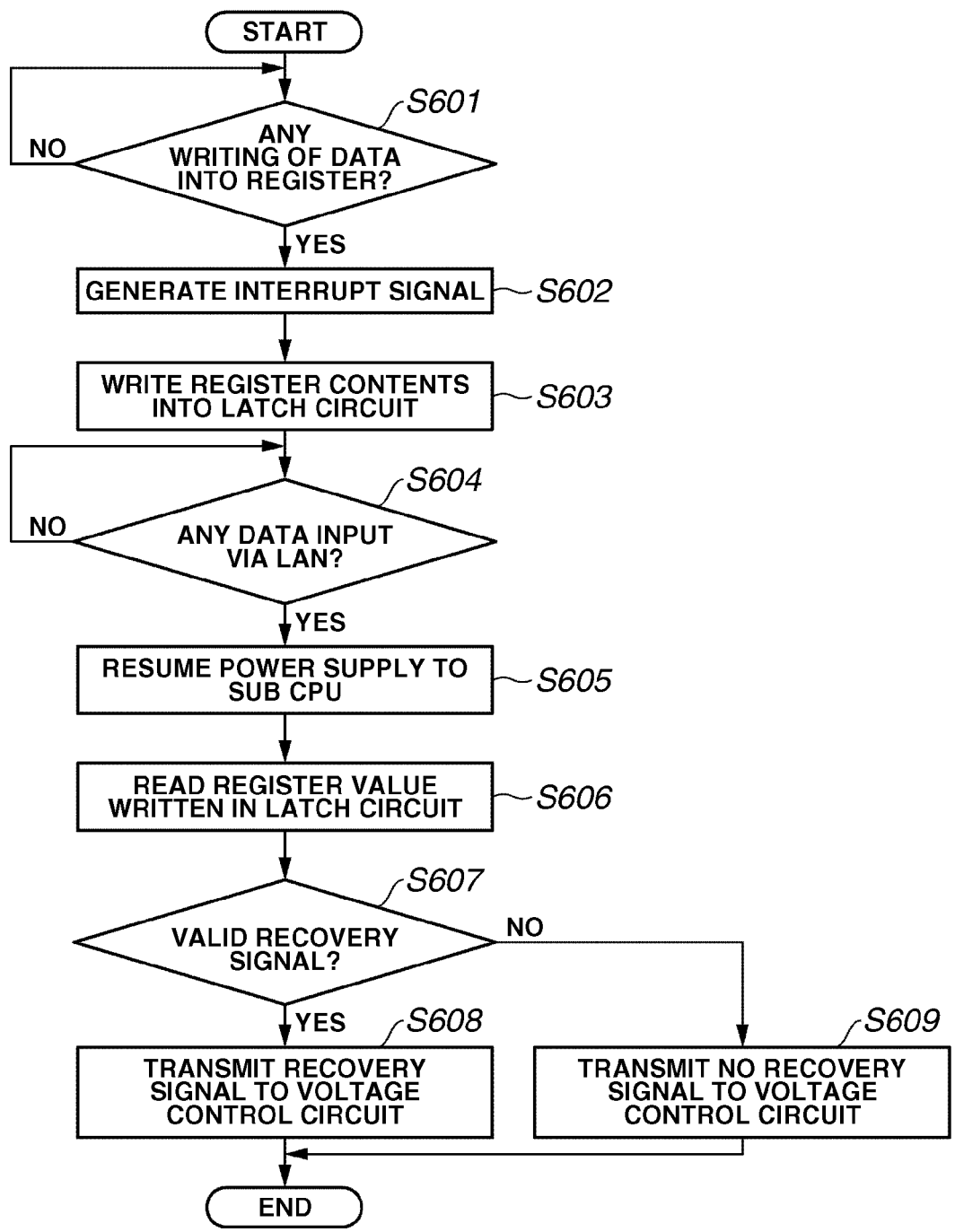

INFORMATION PROCESSING APPARATUS INCLUDING A FIRST BUS CONNECTED A FIRST BUS DEVICE, A SECOND BUS CONNECTED TO A SECOND BUS DEVICE, A THIRD BUS CONNECTED TO A THIRD BUS DEVICE, A FIRST BUS BRIDGE CONNECTING THE FIRST BUS AND THE SECOND BUS AND A SECOND BUS BRIDGE CONNECTING THE FIRST BUS AND THE THIRD BUS

BACKGROUND OF THE INVENTION

1. Field of the Invention

The present invention relates to an information processing apparatus.

2. Description of the Related Art

A conventional information processing apparatus includes a bus bridge connecting a plurality of buses, wherein one or plural bus devices can be connected to each bus. A conventional information processing apparatus can include a PCI-to-PCI bus bridge to connect two independent PCI buses. The PCI bus bridges are generally classified into transparent bus bridges and non-transparent bus bridges.

In the transparent PCI-to-PCI bus bridges, addresses of primary and secondary buses are present in the same memory space. In the non-transparent PCI-to-PCI bus bridges, addresses of primary and secondary buses are present in different memory spaces. The non-transparent PCI-to-PCI bus bridge has an address conversion function for transmitting transactions from the primary bus to the secondary bus.

The non-transparent PCI-to-PCI bus bridge can also perform address conversion to transmit transactions from the secondary bus to the primary bus. The non-transparent PCI-to-PCI bus bridge has a power control register (i.e., power management register) in an integrated circuit forming the bus bridge. The register value can be used to control the operation of bus devices connected to the primary bus and the secondary bus (for example, refer to Japanese Patent Application Laid-open No. 10-254570).

As described above, the conventional non-transparent PCI-to-PCI bus bridge includes the power management register in the integrated circuit forming the bus bridge. The register value in the power management register is constantly referred to, when the information processing apparatus is in a power saving state. Accordingly, power supply to the bus bridge cannot be stopped even in the power saving state. As a result, a significant amount of electric power is consumed in the bus bridge.

SUMMARY OF THE INVENTION

Embodiments of the present invention are directed to a technique capable of mitigating the above-described problems.

According to an aspect of the present invention, an information processing apparatus includes a bus bridge connecting a first bus and a second bus, which can stop power supply to the bus bridge when the information processing apparatus is in a power saving state, thus reducing electric power consumption.

According to one aspect of the present invention, an information processing apparatus includes a first bus connected a first bus device, a second bus connected to a second bus device, and a bus bridge connecting the first bus and the second bus. The information processing apparatus includes a power control unit configured to control electric power supplied to the information processing apparatus, which supplies electric power to the first bus device and the bus bridge when the information processing apparatus is in an operative state, and stops power supply to the first bus device and the bus bridge when the information processing apparatus is in a power saving state. Furthermore, the information processing apparatus includes a transmission control unit configured to control transmission of a recovery signal which is entered from the second bus device and transmitted to the power control unit to return the information processing apparatus from the power saving state to the operative state, when the information processing apparatus is in the power saving state. The power control unit resumes the power supply to the first bus device and the bus bridge in response to the recovery signal transmitted by the transmission control unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 3 is a table showing exemplary settings with respect to the validity of a transfer operation in response to data input in each power saving level of the power saving state.

FIG. 6 is a flowchart showing an exemplary operation of a network interface card in accordance with another exemplary embodiment.

DETAILED DESCRIPTION OF THE EMBODIMENTS

Figure 1:
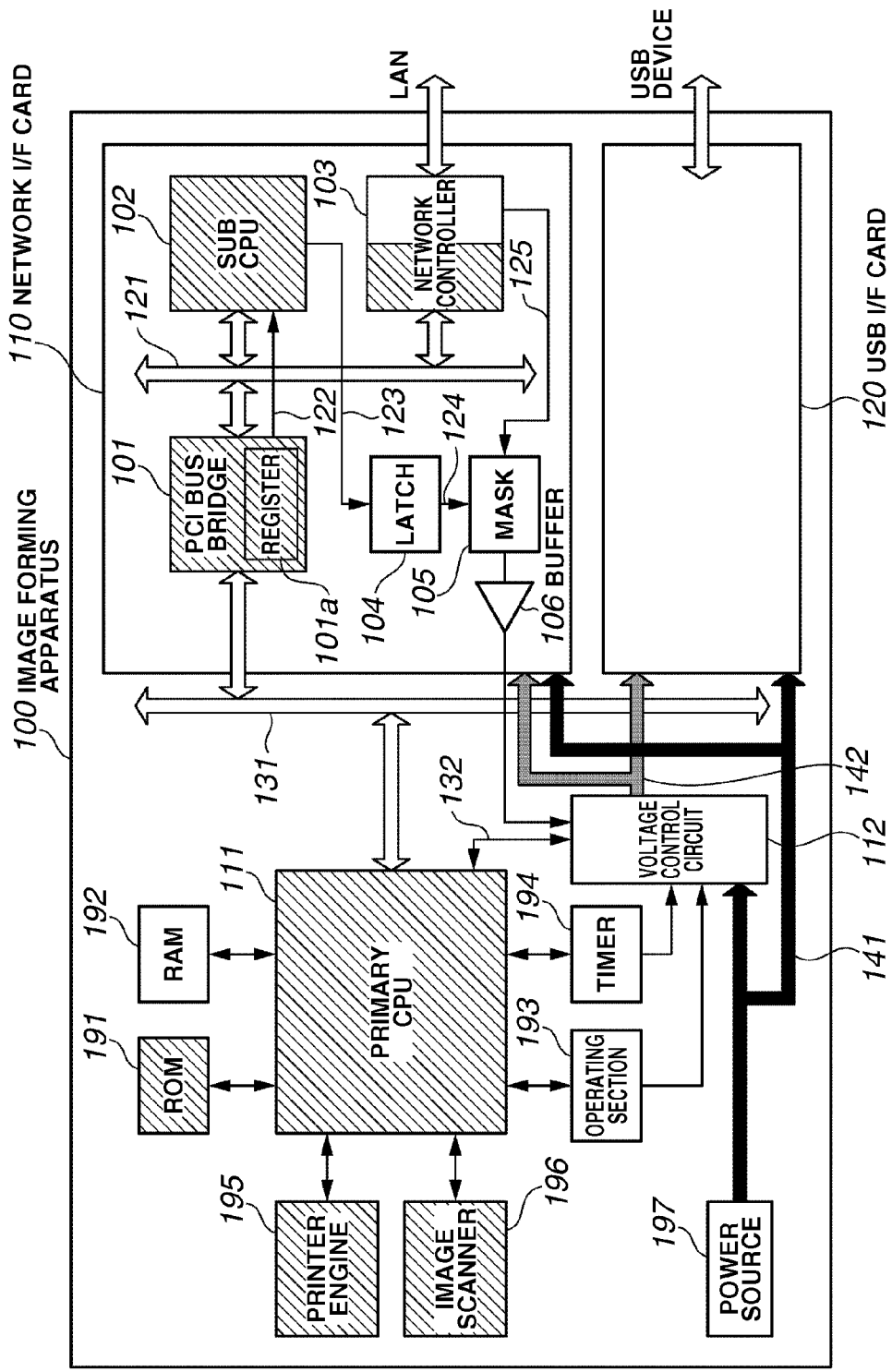
FIG. 1 is an exemplary block diagram illustrating an image forming apparatus in accordance with an exemplary embodiment.

The following description of exemplary embodiments is merely illustrative in nature and is in no way intended to limit the invention, its application, or uses.

Processes, techniques, apparatus, and materials as known by one of ordinary skill in the art may not be discussed in detail but are intended to be part of the enabling description where appropriate.

For example, certain circuitry for signal processing, calculating, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described with reference to one figure, it may not be discussed for following figures.

Exemplary embodiments will be described in detail below with reference to the drawings.

First Exemplary Embodiment

FIG. 1 illustrates an image forming apparatus 100 capable of functioning as an information processing apparatus. A primary central processing unit (CPU) 111 can control the image forming apparatus 100. A read-only memory (ROM) 191 can store program code of the program that the primary CPU 111 can execute and font information used when a printer engine executes print processing based on image data. A random access memory (RAM) 192 can include a work area (i.e., temporary data storage region) and store image data, when the primary CPU 111 executes the program.

An operating section 193 enables a user of the image forming apparatus 100 to input various settings data and information for the image forming apparatus 100. A timer 194, having an alert function, can measure time and output an event signal to the primary CPU 111 at predetermined timing.

An image scanner 196 can read images including text data (letters, symbols, etc.) on a sheet (i.e., original) and can input the readout image data into a RAM 192. The printer engine 195 can form an image on a recording paper based on the image data stored in the RAM 192. The image data stored in the RAM 192 include image data entered from the image scanner 196 and image data produced based on print data received via a network interface card 110 from the local area network (LAN)

A voltage control circuit 112 can supply a constant voltage equal to 3.3 V to the network interface circuit 110 via a sub power supply line 142 when the image forming apparatus 100 is in an operative state. On the other hand, the voltage control circuit 112 stops voltage supply to the image forming apparatus 100 via the sub power supply line 142, when the image forming apparatus 100 is in a power saving state. The voltage control circuit 112 can also control voltage supply to a universal serial bus (USB) interface card 120.

The primary CPU 111 can transmit a voltage stop signal via a signal line 132 to the voltage control circuit 112, when the primary CPU 111 determines to transfer the image forming apparatus 100 into the power saving state to reduce electric power consumption. In response to the voltage stop signal sent from the primary CPU 111, the voltage control circuit 112 can stop voltage supply to the network interface card 110 and the USB interface card 120.

The network interface card 110 can receive print data from an external device via the LAN, and can transfer the received print data via a primary bus 131 to the RAM 192. The network interface card 110 has the following circuits.

A non-transparent PCI-to-PCI bus bridge (hereinafter, referred to as "bus bridge") 101 can connect the primary PCI bus 131 (hereinafter, referred to as "primary bus 131") and a secondary PCI bus 121 (hereinafter, referred to as "secondary bus 121"). The bus bridge 101 can convert address information to enable the primary bus 131 and the secondary bus 121 to access each other. While the exemplary embodiment shown in FIG. 1 includes one bus bridge 101 and one secondary bus, it will be appreciated that multiple bus bridges 101 can be used to connect multiple secondary buses 121 to the primary bus 131.

A sub CPU 102 can control the network interface card 110. A network controller 103 can control reception of print data via the LAN and control transmission of information notifying an apparatus state (i.e., information showing the operating state of the image forming apparatus 100) to other devices connected via the LAN.

A latch circuit 104 can store power control information which is set in the bus bridge 101. A mask circuit 105 can determine whether a recovery signal (i.e., /PME signal) produced from the network controller 103 should be transmitted to the voltage control circuit 112. The recovery signal (i.e., /PME signal) can be produced from the network controller 103 in response to entry of data via the LAN to the network interface card 110 which is operating in the power saving state.

An open-drain type buffer 106 has the capability of buffering the recovery signal (i.e., /PME signal) transmitted from the mask circuit 105. The bus bridge 101 can transmit an interrupt signal via an interrupt signal line 122 to the sub CPU 102, when the primary CPU 111 writes a registration value into a power management register 101a of the bus bridge 101. The registration value of the bus bridge 101 can be written into the latch circuit 104 via a signal line 123, in response to the interrupt signal sent from the bus bridge 101 to the sub CPU 102.

The latch circuit 104 can output a signal corresponding to the registration value written in the latch circuit 104, via a signal line 124, to the mask circuit 105, to determine whether the mask circuit 105 should mask the recovery signal (i.e., /PME signal). The network controller 103 can transmit the recovery signal (i.e., /PME signal) to the mask circuit 105 via a signal line 125.

The USB interface card 120 can function as an interface capable of connecting the image forming apparatus 100 to a USB device. For example, a personal computer (i.e., a representative USB device) can transmit print data via the USB interface card 120 to the image forming apparatus 100. In addition to the above-described network interface card 110 and the USB interface card 120, other PCI devices can be connected to the secondary bus 121 of the image forming apparatus 100. To expand or enhance the abilities of the image forming apparatus 100, various PCI devices can be connected to the primary bus 131 of the image forming apparatus 100.

Next, the operation of the image forming apparatus 100 will be described.

The image forming apparatus 100 can cause the printer engine 195 to perform a copy operation to form an image on a recording paper based on the image data entered from the image scanner 196. Furthermore, the image forming apparatus 100 can execute various operations including a print operation for forming an image on a printing paper based on the print data received from the network interface card 110. However, the image forming apparatus 100 is not always performing the copy operation or the print operation.

Hence, the primary CPU 111 controls the voltage control circuit 112 to stop power supply to each section of the image forming apparatus 100, when the image forming apparatus 100 is not in the operative state (hereinafter, referred to as "inoperative state").

For example, the primary CPU 111 can determine that the image forming apparatus 100 is in the inoperative state if all of the following conditions are satisfied.

(1) No image data is entered from the image scanner 196 for a predetermined period of time.
(2) No print data is entered via the network interface card 110 for a predetermined period of time.
(3) No print data is entered via the USB interface card 120 for a predetermined period of time.
(4) No user's operation is entered via the operating section 193 for a predetermined period of time.

If the image forming apparatus 100 includes a power saving key, the primary CPU 111 can determine that the image forming apparatus 100 is transferred into the inoperative state when a user of the image forming apparatus 100 presses the power saving key.

Moreover, the user of the image forming apparatus 100 can input, via the operating section 193, a preset time for shifting the image forming apparatus 100 into the power saving state. In this case, the primary CPU 111 of the image forming apparatus 100 transfers the image forming apparatus 100 into the power saving state in response to count-up of the preset time measured by the timer 194.

When the primary CPU 111 determines that the image forming apparatus 100 is in the inoperative state, the primary CPU 111 transmits a signal instructing the image forming apparatus 100 to shift its operation into the power saving state, via the signal line 132, to the voltage control circuit 112.

Next, the operation of the voltage control circuit 112 executed in response to the signal instructing the image forming apparatus 100 to select the power saving state will be described. The image forming apparatus 100 is equipped with a power source 197.

The power source 197 can receive electric power supplied from a commercial power source when a main switch of the image forming apparatus 100 is turned on. The power source 197 supplies a constant voltage equal to 3.3 V via a main power supply line 141 to the network interface card 110 and the USB interface card 120.

The network interface card 110 includes various internal circuits. However, only the latch circuit 104, the mask circuit 105, the buffer 106 and a partial portion of the network controller 103 can receive electric power via the main power supply line 141 during the power saving state of the image forming apparatus 100. The partial portion of the network controller 103 is required to determine whether any data is input from the LAN when the image forming apparatus 100 is in the power saving state.

Moreover, the main power supply line 141 supplies a constant voltage equal to 3.3 V to the voltage control circuit 112. The voltage control circuit 112 supplies the input voltage (i.e., 3.3 V), via the sub power supply line 142, to the network interface card 110 and the USB interface card 120. The voltage entered via the sub power supply line 142 to the network interface card 110 is supplied to the PCI bus bridge 101, the sub CPU 102 and the partial portion of the network controller 103.

The voltage control circuit 112 performs the following operations when the primary CPU 111 determines that the image forming apparatus 100 is in the operative state. The voltage control circuit 112 inputs the constant voltage equal to 3.3 V from the main power supply line 141 and outputs the voltage via the sub power supply line 142 to the network interface card 110 and the USB interface card 120.

Moreover, the voltage control circuit 112 performs the following operations when the primary CPU 111 determines that the image forming apparatus 100 is in the inoperative state. The voltage control circuit 112 does not output the input voltage via the sub power supply line 142 to the network interface card 110 and the USB interface card 120. The voltage control circuit 112 can transfer the image forming apparatus 100 into the power saving state by stopping power supply via the sub power supply line 142.

The primary CPU 111, the ROM 191, the printer engine 195 and the image scanner 196 of the image forming apparatus 100 can receive electric power supplied from a separately provided power source other than the power source 197. When the image forming apparatus 100 is in the operative state, electric power is supplied to primary CPU 111, the ROM 191, the printer engine 195 and the image scanner 196. When the image forming apparatus 100 is in the power saving state, no electric power is supplied to primary CPU 111, the ROM 191, the printer engine 195 and the image scanner 196.

Figure 2:
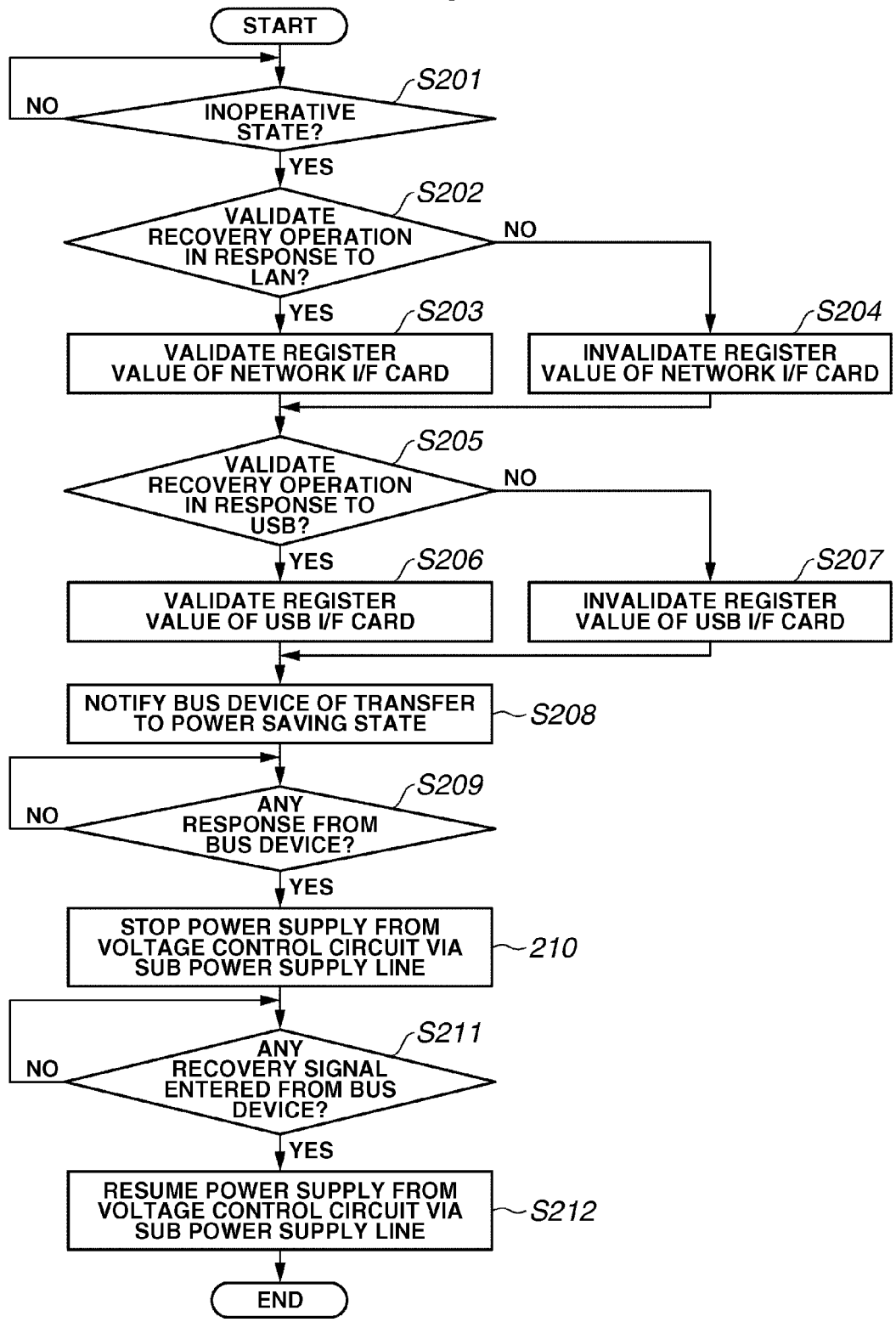
FIG. 2 is a flowchart showing exemplary operations of a primary central processing unit (CPU) and a voltage control circuit in accordance with an exemplary embodiment.

Next, exemplary operations of the primary CPU 111 and the voltage control circuit 112 will be described with reference to the flowchart of FIG. 2. In step S201, the primary CPU 111 determines whether the image forming apparatus 100 is in an inoperative state according to the above-described method. When the image forming apparatus 100 is in an operative state, the processing flow returns to step S201. When the image forming apparatus 100 is in the inoperative state, the processing flow proceeds to step S202.

In step S202, the primary CPU 111 determines whether a transfer operation for returning the image processing apparatus 100 to the operative state from the power saving state is valid or invalid, when any data is input via the LAN to the image forming apparatus 100 which is operating in the power saving state. In this case, the primary CPU 111 determines that the transfer operation is "valid" if the power saving state is in a power saving level 1. On the other hand, the primary CPU 111 determines that the transfer operation is "invalid" if the power saving state is in a power saving level 2.

The above settings are required because the power saving state of the image forming apparatus 100 includes plural levels differentiated in the effects of power saving. More specifically, when any data is entered via the LAN, it is desirable to switch the validation of the transfer operation between "valid" and "invalid" depending on each power saving level of the power saving state.

FIG. 3 shows exemplary settings with respect to the validity of a transfer operation in response to data input in each power saving level of the power saving state.

According to the example of FIG. 3, the power saving state includes two power saving levels. Compared to the power saving level 1, the power saving level 2 can save a greater amount of electric power consumed in the image forming apparatus 100. For example, when the power saving state is in the power saving level 1, the primary CPU 111 and the ROM 191 can receive electric power. On the other hand, when the power saving state is in the power saving level 2, no electric power is supplied to the primary CPU 111 and the ROM 191.

The validity of the recovery signal in each power saving level can be set in the following manner. According to the settings shown in FIG. 3, when the data is input via the LAN in the power saving level 1, the recovery signal is set to be valid. More specifically, when the data is input via the LAN, the recovery signal is input to the voltage control circuit 112. The voltage control circuit 112 resumes the voltage supply to the sub power supply line 142.

On the other hand, when the data is input via the LAN in the power saving level 2, the recovery signal is set to be invalid. More specifically, when the data is input via the LAN, the recovery signal is not input to the voltage control circuit 112. The voltage control circuit 112 does not resume the voltage supply to the sub power supply line 142.

For example, a user can determine beforehand the settings shown in FIG. 3 via the operating section 193 so that the validity of the recovery signal can be differentiated according to each power saving level. Additionally, a user of a personal computer connected to the LAN can input settings with respect to the validity of the recovery signal differentiated for each power saving level.

When the decision is YES (i.e., valid transfer operation) in step S202, the processing flow proceeds to step S203. When the decision is NO (i.e., invalid transfer operation) in step S202, the processing flow proceeds to step S204. In step S203, the primary CPU 111 performs the following settings to validate the recovery operation from the power saving state to the operative state, in response to the data input via the LAN in the power saving state. More specifically, the primary CPU 111 sets, in the register 101*a* of the bus bridge 101, a recovery permission bit (i.e., PME _En) to "1" which indicates that the recovery from the power saving state to the operative state is valid.

On the other hand, in step S204, the primary CPU 111 performs the following settings to invalidate the recovery operation from the power saving state to the operative state, in response to the data input via the LAN in the power saving state. More specifically, the primary CPU 111 sets, in the register 101*a* of the bus bridge 101, the recovery permission bit (i.e., PME _En) to "0" which indicates that the recovery from the power saving state to the operative state is invalid.

Then, in step S205, the primary CPU 111 determines whether a transfer operation for returning the image processing apparatus 100 to the operative state from the power saving state is valid or invalid, when any data is input via the USB to the image forming apparatus 100 which is operating in the power saving state. In this case, the primary CPU 111 determines that the transfer operation is "valid" if the power saving state is in the power saving level 1. On the other hand, the primary CPU 111 determines that the transfer operation is "invalid" if the power saving state is in the power saving level 2.

When the decision is YES (i.e., valid) in step S205, the processing flow proceeds to step S206. When the decision is NO (i.e., invalid) in step S205, the processing flow proceeds to step S207.

In step S206, the primary CPU 111 performs the following settings to validate the recovery operation from the power saving state to the operative state, in response to the data input via the USB in the power saving state. More specifically, the primary CPU 111 sets, in a register of a bus bridge (not shown) equipped in the USB interface card 120, a recovery permission bit (i.e., PME _En) to "1" which indicates that the recovery from the power saving state to the operative state is valid.

On the other hand, in step S207, the primary CPU 111 performs the following settings to invalidate the recovery operation from the power saving state to the operative state, in response to the data input via the USB in the power saving state. More specifically, the primary CPU 111 sets, in the register of the bus bridge (not shown) equipped in the USB interface card 120, the recovery permission bit (i.e., PME _En) to "0" which indicates that the recovery from the power saving state to the operative state is invalid.

Next, in step S208, the primary CPU 111 notifies the bus devices connected to the primary bus 131 of the transfer of the image processing apparatus 100 shifting into the power saving state. In the exemplary embodiment, the bus devices connected to the primary bus 131 are the network interface card 110 and the USB interface card 120. Each bus device terminates the operation presently executing in the device in response to the notice sent from the primary CPU 111 (i.e., the indication that the image processing apparatus 100 shifts into the power saving state) and returns a termination response to the primary CPU 111.

In step S209, the primary CPU 111 determines whether each of the bus devices connected to the primary bus 131 has returned the termination response. When the decision in step S209 is YES, the processing flow proceeds to step S210.

In step S210, the primary CPU 111 transmits the voltage stop signal to the voltage control circuit 112 via the signal line 132. In response to the voltage stop signal sent from the primary CPU 111, the voltage control circuit 112 stops supplying electric power to the bus devices via the sub power supply line 142.

In step S211, the voltage control circuit 112 determines whether any recovery signal is entered from the bus devices. In the present exemplary embodiment, a recovery signal is input to the voltage control circuit 112 in response to data input via the LAN or the USB, when the image forming apparatus 100 is in the power saving state of power saving level 1.

However, when the image forming apparatus 100 is in the power saving state of power saving level 2, the recovery signal responding to the data input via the LAN or the USB is invalidated. Thus, no recovery signal is input to the voltage control circuit 112.

In step S212, in response to entry of the recovery signal, the voltage control circuit 112 resumes the power supply to the bus devices via the sub power supply line 142.

Figure 4:
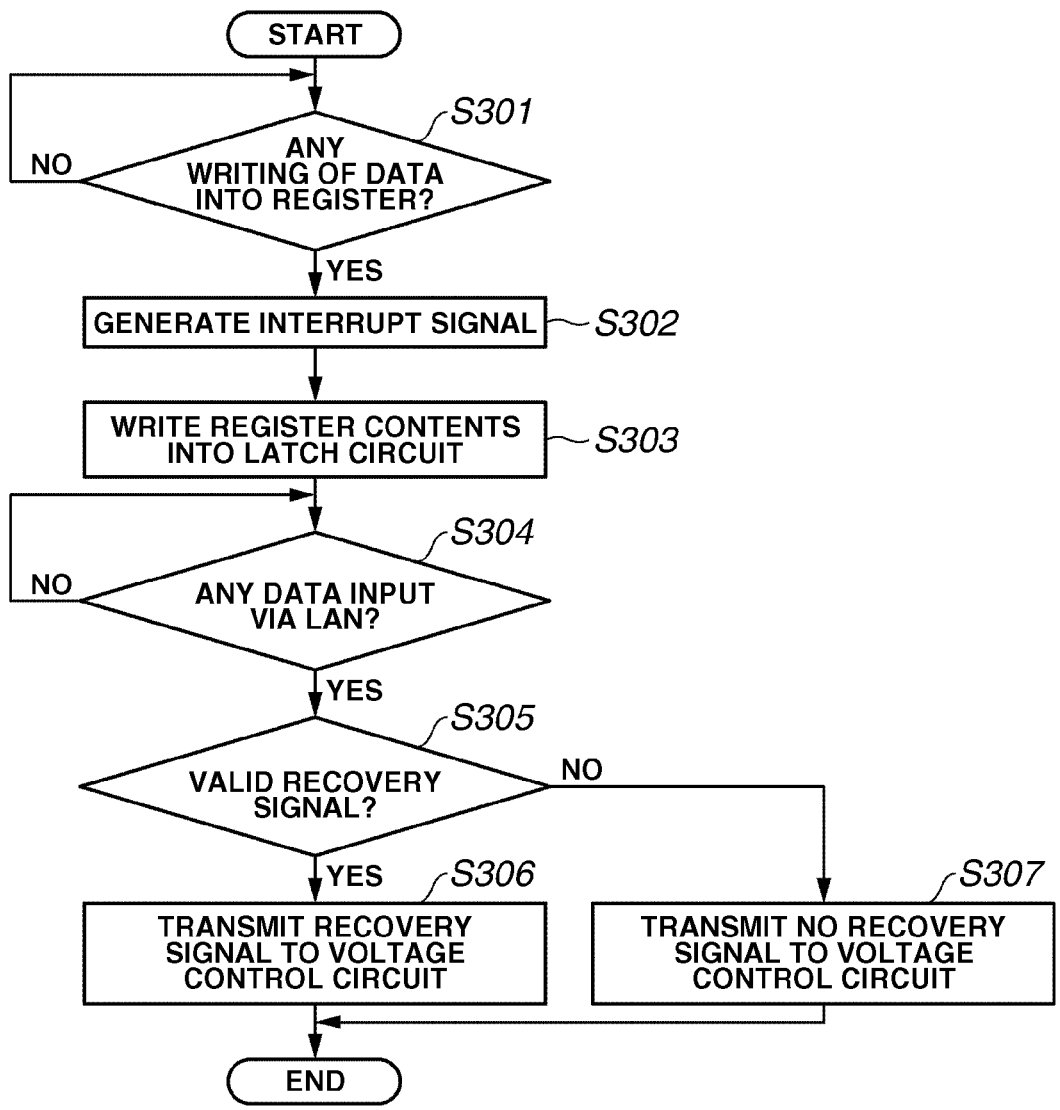
FIG. 4 is a flowchart showing an exemplary operation of a network interface card in accordance with an exemplary embodiment.

Next, an exemplary operation of the network interface card 110 will be described with reference to the flowchart of FIG. 4.

In step S301, the bus bridge 101 determines whether the primary CPU 111 has performed the writing of data into the register 101*a* via the primary bus 131. When the decision is YES in step S301, the processing flow proceeds to step S302. Otherwise, the processing flow returns to step S301. In step S302, the bus bridge 101 outputs an interrupt signal via the signal line 122 to the sub CPU 102.

In step S303, in response to the interrupt signal sent from the bus bridge 101, the sub CPU 102 reads the contents written in the register 101*a* and writes the readout register value to the latch circuit 104. After completing the processing of step S303, the voltage control circuit 112 stops voltage supply to the bus bridge 101, the sub CPU 102, and the partial portion of the network controller 103.

In step S304, the network controller 103 determines whether any data is input via the LAN. When the decision is YES in step S304, the processing flow proceeds to step S305. During the processing of step S304, electric power is supplied to a limited portion of the network controller 103 to detect data input via, at least, the LAN and to transmit a recovery signal via the signal line 125 to the mask circuit 105. [0074] In step S305, the latch circuit 104 outputs, to the mask circuit 105, a signal corresponding to a value stored in the register 101a. The mask circuit 105 stores the register value stored in the latch circuit 104. When the latch circuit 104 stores a value validating the recovery signal (i.e., /PME signal), the decision is YES in step S305. Thus, the mask circuit 105 does not mask the recovery signal and transmits the recovery signal to the voltage control circuit 112 (refer to step S306). When the recovery signal is transmitted to the voltage control circuit 112 in step S306, the voltage control circuit 112 resumes the voltage supply via the sub power supply line 142 to the bus devices. [0075] On the other hand, when the latch circuit 104 stores a value invalidating the recovery signal (i.e., /PME signal), the decision is NO in step S305. Thus, the mask circuit 105 masks the recovery signal and transmits no recovery signal to the voltage control circuit 112 (refer to step S307). [0076] Although the flowchart of FIG. 4 shows the operation of the network interface card 110, the USB interface card 120 can execute a similar operation. When the image forming apparatus 100 is in the power saving state, the voltage supply to the network interface card 110 resumes in response to data input via the LAN based on the operation shown in FIG. 3. Furthermore, the voltage supply to the USB interface card 120 resumes.

More specifically, when the recovery signal is input from the network interface card 110 (i.e., other bus device) connected to the primary bus 131, the operating condition of the image forming apparatus 100 shifts from the power saving state to the operative state regardless of data input from a USB device.

In the exemplary embodiment, the voltage control circuit 112 can be modified so as to resume the power supply to the network interface card 110 in response to data input via the LAN and stop the voltage supply to the USB interface card 120. In this case, electric power consumption in the bus device relating to the interface which does not input data can be reduced.

As described above, the first exemplary embodiment can write, into the latch circuit 104, a stored value in the register 101a of the bus bridge 101 via the sub CPU 102. The image forming apparatus 100 includes the primary bus 131, the secondary bus 121, and the bus bridge 101 connecting the primary bus 131 and the secondary bus 121. When the image forming apparatus 100 is transferred into the power saving state, electric power consumption can be reduced by stopping power supply to the bus bridge 100.

Second Exemplary Embodiment

Figure 5:
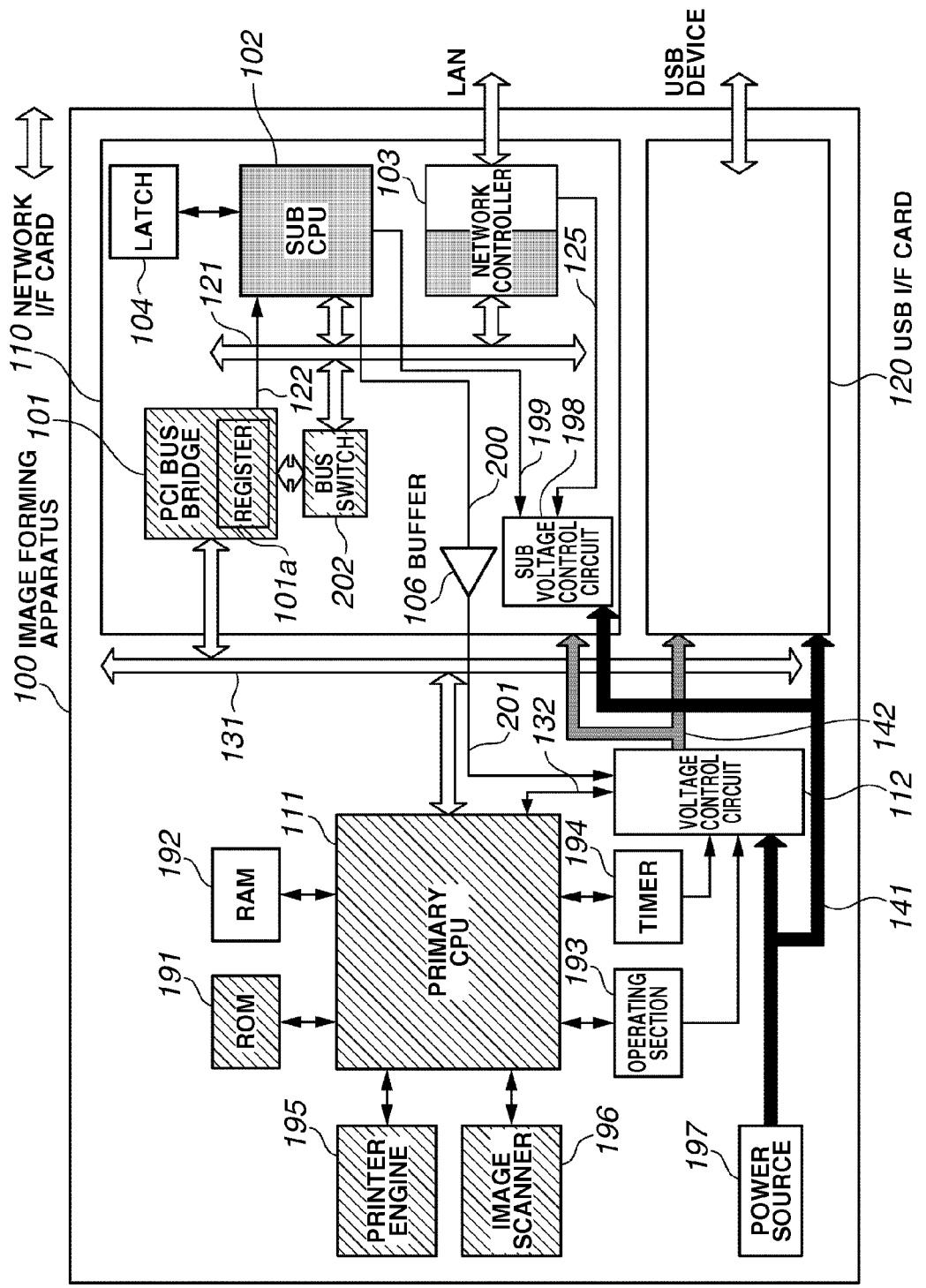
FIG. 5 is a block diagram illustrating an image forming apparatus in accordance with another exemplary embodiment.

FIG. 5 illustrates an image forming apparatus 100 in accordance with a second exemplary embodiment. The second exemplary embodiment is a modified embodiment of the first exemplary embodiment and is characterized in the following features compared to the first exemplary embodiment.

According to the first exemplary embodiment, the network controller 103 outputs the recovery signal (i.e., /PME signal) via the mask circuit 105 and the buffer 106 to the voltage control circuit 112 in response to data input via the LAN. The second exemplary embodiment is different in that the network interface card 110 includes a sub voltage control circuit 198 and a bus switch 202.

The sub voltage control circuit 198 can output, to the sub CPU 102 and the partial portion of the network controller 103 (gray portion), the voltage entered via the main power supply line 141 from the power source 197 when the image forming apparatus 100 is in an operative state.

Furthermore, the sub voltage control circuit 198 can receive a voltage stop signal from the sub CPU 102 via the signal line 199 when the image forming apparatus 100 shifts from the operative state to the power saving state. Moreover, the sub voltage control circuit 198 can stop voltage supply to the sub CPU 102 and the partial portion of the network controller 103 (gray portion).

The bus switch 202 enables the bus bridge 101 and the secondary bus 121 to transfer the data between them, and blocks any current flowing between the bus bridge 101 and the secondary bus 121. Similar to the first exemplary embodiment, the latch circuit 104 can hold the value of the register 101a. The latch circuit 104 of the second exemplary embodiment is connected only to the sub CPU 102. The second exemplary embodiment does not include the mask circuit 105, and is therefore different from the first exemplary embodiment which outputs the register value to the mask circuit 105.

Next, an exemplary operation of the network interface card 110 will be described with reference to the flowchart of FIG. 6. The flowchart of FIG. 6 is a modification of the flowchart of FIG. 3. The processing of steps S601 through S604 in FIG. 6 is similar to the processing of steps S301 through S304 in FIG. 3 and will not be described below.

In step S605, the sub voltage control circuit 198 resumes the voltage supply to the sub CPU 102 and the partial portion of the network controller 103 in response to data input via the LAN (i.e., in response to the entry of the recovery signal). The sub CPU 102 executes predetermined initialization processing when the voltage supply is resumed.

In step S606, the sub CPU 102 reads the register value written in the latch circuit 104 after the initialization processing is accomplished. In step S607, the sub CPU 102 determines whether the recovery signal is validated, with reference to the readout register value.

When the latch circuit 104 stores a value validating the recovery signal (i.e., /PME signal), the decision is YES in step S607. The sub CPU 102 transmits the recovery signal to the voltage control circuit 112 (refer to step S608). When the recovery signal is transmitted to the voltage control circuit 112 in step S608, the voltage control circuit 112 resumes the voltage supply via the sub power supply line 142 to the bus devices. On the other hand, when the latch circuit 104 stores a value invalidating the recovery signal (i.e., /PME signal), the decision is NO in step S607. The sub CPU 102 does not transmit the recovery signal to the voltage control circuit 112 (refer to step S609).

As described above, the second exemplary embodiment can write, into the latch circuit 104, a stored value in the register 101a of the bus bridge 101 via the sub CPU 102. The image forming apparatus 100 includes the primary bus 131, the secondary bus 121, and the bus bridge 101 connecting the primary bus 131 and the secondary bus 121. When the image forming apparatus 100 is transferred into the power saving state, electric power consumption can be reduced by stopping power supply to the bus bridge 100.

In the above-described exemplary embodiments, the network interface card 110 and the USB interface card 120 are bus devices connected to the primary bus 131. However, any other type of cards can be connected to the primary bus 131. For example, functions of the network interface card 110 can be integrated into a single chip. Moreover, functions of the USB interface card 120 can be integrated into a single chip. Furthermore, software (program code) for realizing the functions of the above-described exemplary embodiments can be supplied, via a storage medium (or a recording medium), to a system or an apparatus. A computer (or CPU or micro-processing unit (MPU)) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, the program code installed in the computer and a recording medium storing the program are used to implement the present invention.

In other words, the present invention encompasses a computer program that can realize the functions or processes of the exemplary embodiments or any recording medium that can store the program. In this case, the type of program can be any one of object code, interpreter program, and OS script data, or some combination thereof.

A storage medium supplying the program code can be selected from any one of a floppy disk, a hard disk, an optical disk, a magneto-optical disk, an magneto-optical (MO) disk, a compact disk—ROM (CD-ROM), a CD-recordable (CD-R), a CD-rewritable (CD-RW), a magnetic tape, a nonvolatile memory card, a ROM, and a digital versatile disk (DVD) (DVD-ROM, DVD-R).

The method for supplying the programs includes accessing a home page on the Internet using the browsing function of a client computer when the home page allows each user to download the computer program of the present invention, or compressed files of the programs having automatic installing functions, to a hard disk or other recording medium of the user. Furthermore, the programs can be downloaded by accessing other computers connected via a commercial network or a local network.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs in a CD-ROM or comparable recording medium is an exemplary method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiment can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-324786 filed Nov. 9, 2005, which is hereby incorporated by reference herein in its entirety.

What is claimed is:

1. An information processing apparatus including a first bus connected a first bus device, a second bus connected to a second bus device, and a first bus bridge connecting the first bus and the second bus, comprising:

a third bus connected to a third bus device;

a second bus bridge connecting the first bus and the third bus;

a power control unit configured to control electric power supplied to the information processing apparatus, which supplies electric power to the first bus device and the first bus bridge when the information processing apparatus is in an operative state, and stops power supply to the first bus device and the first bus bridge when the information processing apparatus is in a power saving state;

a first transmission control unit configured to control transmission of a recovery signal which is entered from the second bus device and transmitted to the power control unit to return the information processing apparatus from the power saving state to the operative state, when the information processing apparatus is in the power saving state; and a second transmission control unit configured to control transmission of a recovery signal which is entered from the third bus device and transmitted to the power control unit when the information processing apparatus is in the power saving state, wherein the power control unit resumes the power supply to the first bus device and the first bus bridge in response to the recovery signal transmitted by the first transmission control unit, and the power control unit resumes power supply to the first bus device and the first bus bridge in response to the recovery signal transmitted by the second transmission control unit.

2. The information processing apparatus according to claim 1, wherein each of the first bus and the second bus is a PCI bus.

3. The information processing apparatus according to claim 1, wherein the first bus bridge includes a setting unit configured to set the transmission of the recovery signal transmitted to the power control unit, and the bus bridge causes the first transmission control unit to store a setting value set by the setting unit.

4. The information processing apparatus according to claim 1, wherein the first bus bridge is a non-transparent PCI-to-PCI bus bridge and the first bus bridge can convert address information to enable the first bus and the second bus to access each other.

5. The information processing apparatus according to claim 1, wherein the second bus device is a connecting device capable of connecting the information processing apparatus to a network, and the recovery signal is entered via the network when the information processing apparatus is in the power saving state.

6. The information processing apparatus according to claim 1, wherein the second bus device includes a control section configured to control the second bus device, wherein the power control unit supplies electric power to the control section when the information processing apparatus is in the operative state and stops power supply to the control section when the information processing apparatus is in the power saving state.

7. The information processing apparatus according to claim 1, wherein the second bus device includes a control section configured to control the second bus device, and a secondary power control unit configured to control electric power supplied to the control section, wherein the secondary power control unit supplies electric power to the control section when the information processing apparatus is in the operative state, and stops power supply to the control section when the information processing apparatus is in the power saving state.

8. The information processing apparatus according to claim 1, wherein the first bus device has the capability of writing the setting value set by the setting unit of the first bus bridge.

9. The information processing apparatus according to claim 1, further including an image forming unit configured to form an image based on image data entered from a network via a connecting device.

* * * * *